United States Patent [19]

Fischer

[11] Patent Number: 5,044,451
[45] Date of Patent: Sep. 3, 1991

[54] DEVICE FOR FORMING AN UNDERCUT IN A DRILLED HOLE

[75] Inventor: Artur Fischer, Waldachtal/Tumlingen, Fed. Rep. of Germany

[73] Assignee: Fischerwerke Artur Fischer GmbH & Co. KG, Tumlingen/Waldachtal, Fed. Rep. of Germany

[21] Appl. No.: 547,671

[22] Filed: Jun. 29, 1990

[30]     Foreign Application Priority Data

Jul. 21, 1989 [DE]   Fed. Rep. of Germany ....... 3924044

[51] Int. Cl.[5] .............................................. E21B 1/00
[52] U.S. Cl. .................................... 175/220; 175/417; 408/56
[58] Field of Search ...................... 408/56, 61; 82/1.5; 175/202, 220, 417, 418, 419, 420

[56]         References Cited
U.S. PATENT DOCUMENTS 4,111,270  9/1978  Fischer et al. ...................... 175/220

FOREIGN PATENT DOCUMENTS 0027605  2/1982  Japan ...................... 408/61

Primary Examiner—Z. R. Bilinsky
Attorney, Agent, or Firm—Michael J. Striker

[57]           ABSTRACT

A device for forming an undercut in a drill hole includes a drilling tool having a shank receivable in a chuck of a drilling machine and having a convex collar supported on a corresponding concave bearing surface of a bearing element of the device. The bearing element has a bore that communicates the bearing surface with an opening which communicates with a source of a lubricant liquid. The collar has at least one groove for conducting the liquid into the drill hole to the drill bit head of the tool.

6 Claims, 1 Drawing Sheet

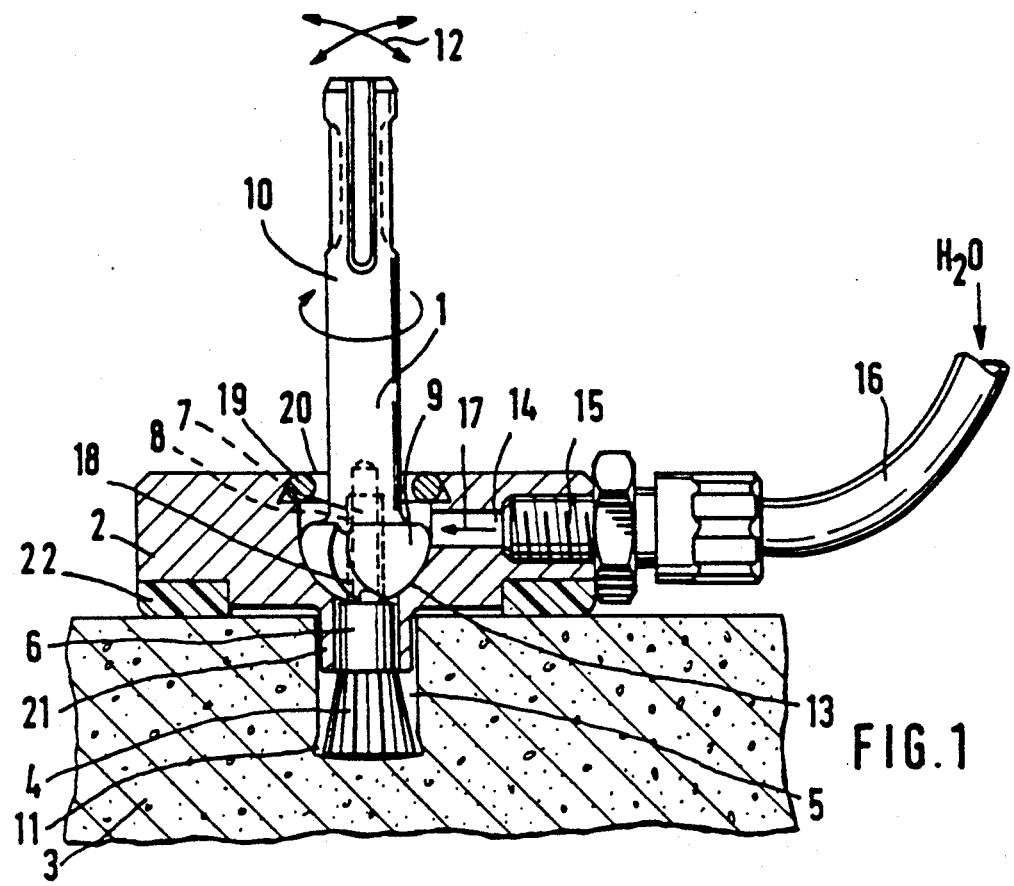
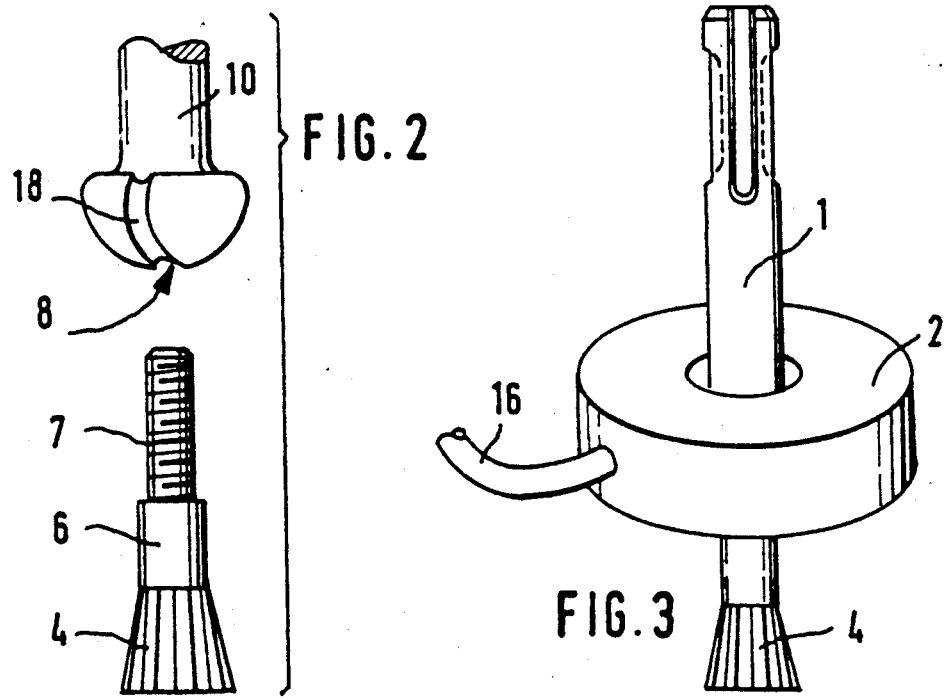

DEVICE FOR FORMING AN UNDERCUT IN A DRILLED HOLE

BACKGROUND OF THE INVENTION

The invention relates to a device for producing an undercut in a drill hole and including a drilling tool provided with a shank adapted to be received in a chuck of a drilling machine and having a convex collar supported on a corresponding concave bearing surface of a bearing element.

To produce an undercut in the drill hole, a drill bit with lateral cutting edges projecting at the drill bit head can be used. The undercut is produced by first of all inserting the drill bit as far as the bottom of the drill hole and then swivelling it in this position. In this process, in the region of the bottom of the drill hole the drill bit head reams out an undercut, into which an expansible plug with an expansible sleeve can be inserted with a matching fit.

Such drill holes with an undercut can be made even in facing panels or similar structures, but in these cases the undercuts have to be very accurate, so that upon insertion and expansion of an expansible anchor, the expansion pressure is not too great. Too great an expansion pressure may result in a part of the facing panel breaking away. To produce an accurate undercut, a drill bit with a diamond milling cutter can be used, but in the process of reaming out the undercut the function of the cutter is severely impaired by the accumulating stone dust.

SUMMARY OF THE INVENTION

The object of the invention is a device for producing an undercut in a drill hole which allows the use of a diamond milling cutter or similar means. The object of the invention is achieved by providing in a bearing element a bore leading to the bearing surface thereof and through which a drilling liquid can be admitted continuously during reaming out of the undercut via a connecting opening and a hose attached thereto. Water can be used as the drilling liquid. The water passes through a groove formed in the convex surface of the collar of the drilling tool to a drill bit head or cutter head at the shank end. During rotation of the drilling tool, the co-rotating groove causes the water to flow into the drill hole and there to rinse away any accumulating drilling dust. Tests have shown that especially accurate undercuts having an extremely smooth wall can be produced using such a device.

The collar is preferably of a semispherical construction and rests on a concave bearing surface of the bearing element constructed as a bearing dish. The radii of the semisphere and the bearing dish being at least approximately the same.

The bearing element may have an integrally formed therewith centering extension which, during the reaming process, engages in the drill hole in the region of the mouth thereof and fixes the bearing element. The external diameter of the centering extension is therefore matched with the diameter of the drill hole in the region of the mouth of the drill hole.

The present invention both as to its construction so to its method of operation, together with additional objects and advantages thereof, will be best understood from the following detailed description of specific embodiments when read in connection with the accompanying drawings.

BRIEF DESCRIPTION OF THE DRAWINGS

FIG. 1 shows a partially cross-sectional view of a device according to the invention;

FIG. 2 shows a drilling tool of the device shown in FIG. 1; and

FIG. 3 shows a general view of a device according to the invention with the bearing element and the drilling tool.

DETAILED DESCRIPTION OF THE PREFERRED EMBODIMENT

A device for producing an undercut in a drill hole and shown in FIG. 1 generally comprises a drilling tool 1 and a bearing element 2 that lies on a wall surface of a panel 3 in which the drill hole with an undercut is formed. The drilling tool 1 has a drill bit head 4 insertable in the drill hole 5. The drill bit head 4 is formed at an end of a straight shank portion 6. The shank pportion 6 is provided with a thread pin 7 threadably received in a thread bore 8 formed in a convex collar 9 of a shank 10 of the drilling tool 1. To form an undercut 11, the shank 10 is clamped in a chuck of a drilling machine (not shown), and is caused to rotate. By simultaneous lateral swivelling, which is indicated by the arrows 12, the undercut 11 can be reamed out in the drill hole 5.

The drilling tool collar 9 is supported by a corresponding semispherical bearing surface 13 which is formed in the bearing element 2. The bearing surface 13 can also be called a bearing dish formed on the bearing element 2. The area of the bearing surface 13 communicates with a bore 14 extending through the bearing element 2. Water or a similar substance can be introduced into the region of the bearing surface 13 of the collar 9. For this purpose, on the bearing element 2 is provided a connecting opening 15 to which a hose 16 of a water supply is connected.

To enable the water flowing in the direction of arrow 17, to reach the drill bit head 4, the collar 9 has an external groove 18 which is inclined slightly with respect to the longitudinal axis of the tool 1. Instead of a groove 18, two or more grooves can be provided, if this is considered appropriate for the particular application. The groove 18 is for conducting the lubricant liquid into a drill hole 15.

A ring-shaped spring member 19 is inserted in an installation opening 20 of the bearing element 2 and secures the tool 1 in the axial direction. At the underside of the bearing element 2, there protrudes a centering extension 21 which projects into the bore 5 to fix and center the drilling too therein.

The bottom surface of the bearing element 2 is provided with a recess for receiving a resilient ring 22 for securing the bearing element 2 against rotation during rotation of the driving tool.

While the invention has been illustrated and with reference to a particular embodiment of a device for forming an undercut in a drill hole, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A device for forming an undercut in a drill hole, comprising a drilling tool having a shank adapted to be clamped in a chuck of a drilling machine and having a convex collar; a bearing element having a cavity with a concave bearing surface corresponding to a convex surface of said convex collar for supporting said convex collar, an opening for communicating with a source of lubricant fluid, and a bore communicating said opening with said cavity, said collar having at least one groove inclined to a longitudinal axis of said drilling tool; and a ring-shaped spring member for securing said drilling tool in said bearing element.

2. A device according to claim 1, wherein said convex collar and said concave bearing surface are spherically rounded.

3. A device according to claim 1, wherein said collar has a semispherical construction, and said concave surface is formed as a bearing dish having substantially the same radius that said convex collar.

4. A device according to claim 1, wherein said bearing element has a centering extension projecting downward.

5. A device according to claim 1, wherein said bearing element has a bottom surface and a recess formed in said bottom surface, said device further comprising a resilient ring received in said recess and forming a non-slip resilient annular surface.

6. A device according to claim 1, wherein said drilling tool has a drill bit head at a free end of said shank, said at least one groove serving for conducting the lubricant fluid to said drill bit head.

* * * * *